United States Patent

Baker

[15] 3,697,860
[45] Oct. 10, 1972

[54] DC STATIC SWITCH CIRCUIT WITH A MAIN SWITCH DEVICE AND A POWER SHARING CIRCUIT PORTION

[72] Inventor: Donal E. Baker, Lima, Ohio

[73] Assignee: Westinghouse Electric Corporation, Pittsburgh, Pa.

[22] Filed: March 15, 1971

[21] Appl. No.: 124,232

[52] U.S. Cl. ..................... 323/9, 323/22 T, 323/25, 323/38
[51] Int. Cl. ............................................ G05f 1/58
[58] Field of Search ......... 317/20, 33 R; 323/9, 22 T, 323/25, 38

[56] References Cited

UNITED STATES PATENTS

| | | |
|---|---|---|
| 3,513,378 | 5/1970 | Kemper ..................... 323/9 |
| 3,096,475 | 7/1963 | Brooks ..................... 323/22 T |
| 2,981,884 | 4/1961 | Tighe ..................... 323/22 T |
| 3,521,150 | 7/1970 | Bates ..................... 323/9 |
| 3,553,531 | 1/1971 | Rimondini ............... 323/22 T |

*Primary Examiner*—A. D. Pellinen
*Attorney*—A. T. Stratton, F. P. Lyle and Gordon H. Telfer

[57] ABSTRACT

A static switch circuit is provided with a power sharing circuit portion operable to dissipate power in resistive dissipation elements so the required dissipation is shared with the main power transistor in the circuit. The result is a circuit with improved current limiting capability and one that permits use of relatively small and inexpensive transistors. The circuit also includes an improved current limiting controller for the switch.

5 Claims, 6 Drawing Figures

WITNESSES:
Bernard R. Gregory
James F. Young

INVENTOR
Donal E. Baker
BY
ATTORNEY

DC STATIC SWITCH CIRCUIT WITH A MAIN SWITCH DEVICE AND A POWER SHARING CIRCUIT PORTION

BACKGROUND OF THE INVENTION

1. Field of the Invention

The invention relates to static DC switch circuits for use in controlling power in electrical systems.

2. State of the Art

Static, e.g., semiconductor, switches are of interest for use in aircraft power systems as well as other applications to secure the recognized advantages of solid state components over electromechanical circuit breaker devices. The static switch circuit has many performance characteristics that are desirably optimized. The basic function of the switch is to serve as a remote power controller, that is, to permit switching of the power to a load from a remote location. An additional required function is for the switch circuit to provide a means for controlled current limiting in order to eliminate transient inrush currents, to protect the load and associated wiring from high fault currents, and to absorb system overvoltage transients rather than pass them on to the load.

Typically, the current limiting level is 140 percent ± 10 percent of rated load current. If a fault occurs and persists for a predetermined length of time, during which the switch circuit is in its current limiting mode of operation, additional circuitry within the power controller can be used to trip and latch off the power controller. The load and fault are thus disconnected from the power bus and will remain disconnected until the power controller is reset. Reference may be made to copending application Ser. No. 124,309, filed Mar. 15, 1971 by D. A. Fox and assigned to the assignee of the present invention for description of a suitable trip circuit for use with a static switch in a power controller.

During the period in which controller current limiting is occurring, the static switch in the power controller must dissipate a power level equal to the switch voltage drop times the load current of 1.4 times rated load current. The maximum power to be dissipated by the power controller occurs with a zero impedance load (i.e., a shorted load or grounded wiring). Thus for a 28 volt system with a rated load current of 10 amperes and a current limiting level of 1.4 times rated load current, the power dissipation level could be as high as 392 watts for nominal-input voltage conditions. This value will be exceeded during voltage transient conditions.

Present technology, such as exemplified by the description in an article by Dickey et al., IEEE Spectrum, November 1970, pages 73–79, has utilized circuits which dissipate all of the power in a single large transistor or a group of smaller transistors using complicated paralleling circuits. Additionally, the level of controlled current limiting is lowered for transient overvoltage conditions in order to eliminate the necessity of overdesigning the power stage.

FIG. 1 is a representative example of a circuit in accordance with previous technology. Transistor 10 is the main power switching transistor with its collector-emitter path connected between a direct voltage source 12 and a load 14. Transistor 10 has a transistor driver circuit portion 15 connected to its base. The driver 15 is also connected to the supply 12 and to a transistor 16 which has on-off signals applied to its base. The portion 18 of the circuit represents means for current limit control, i.e., to control the operation of the driver circuit 15 in accordance with load current (sensed by some sensor means, not shown).

In the operation of the circuit of FIG. 1, application of base drive current to transistor 16 will cause saturation of transistor 10 through the drive circuit 15. Current is then delivered to the load 14. The level of load current is compared by means in controller 18 to a reference level. Controller 18 is responsive to differences of load current from the reference to modify the transistor driver circuitry. If the load impedance is so low that the load current tries to exceed the reference, the controller 18 will reduce the base drive current to transistor 10 to a fixed limit. For a shorted load, full supply voltage will be across transistor 10 with 1.4 times rated current flowing through it imposing substantial power dissipation requirements on transistor 10.

The significance of the transistor's power dissipation will be discussed with reference to FIG. 2. A 10 ampere rated switch has a typical required transistor dissipation level for a shorted load as shown in FIG. 2, Curve A. The duration of a fault is typically limited to 3 seconds maximum by the trip circuit previously referred to. The dissipation levels of FIG. 2 are shown for voltages up to 80 volts. Those voltages above 35 volts, where the nominal supply voltage is 28 volts, are transient overvoltages.

Also shown in FIG. 2, Curve B, is the dissipation capability of one of the largest commercially available transistors 2N2117 (Westinghouse type 125). The rising transistor capability above 45 volts is because these voltage levels are transients. It is apparent from FIG. 2 that transistor 2N2117 cannot safely handle the required dissipation for voltage levels above about 30 volts.

Because of the inability of available transistors to handle the otherwise required dissipation, the current limit level has been necessarily reduced. That is, the current limit controller 18 must include components that lower the maximum current level for overvoltage conditions in order to limit the required dissipation of transistor 10. The result is a workable circuit but one that will trip off under a fault sooner than desirable, merely to save the power transistor. FIG. 5, Curve C, shows maximum load current amperes versus supply voltage for prior technology indicating the necessary drop off in current above 30 volts. Circuits exemplified by that of FIG. 1 are thus limited in performance yet require large, expensive power transistors.

SUMMARY

The present invention provides a circuit with improved current limiting capability and, also, one that permits use of lower cost components than was previously possible. The circuit includes a new sharing circuit portion that puts part of the required power dissipation in resistive dissipation means thus permitting the use of smaller and lower cost power transistors.

The current limit level can remain the same for all transient overvoltage conditions. Implementation of the circuit does not require complicated transistor paralleling or resistance switching circuits.

Improved means for current limit control are also disclosed, including an operational amplifier for comparison of a signal, sensed directly by a D.C. resistive shunt on the load circuit, with a reference and modification of transistor drive circuitry in accordance therewith.

DRAWING

PREFERRED EMBODIMENTS

Figure 3:
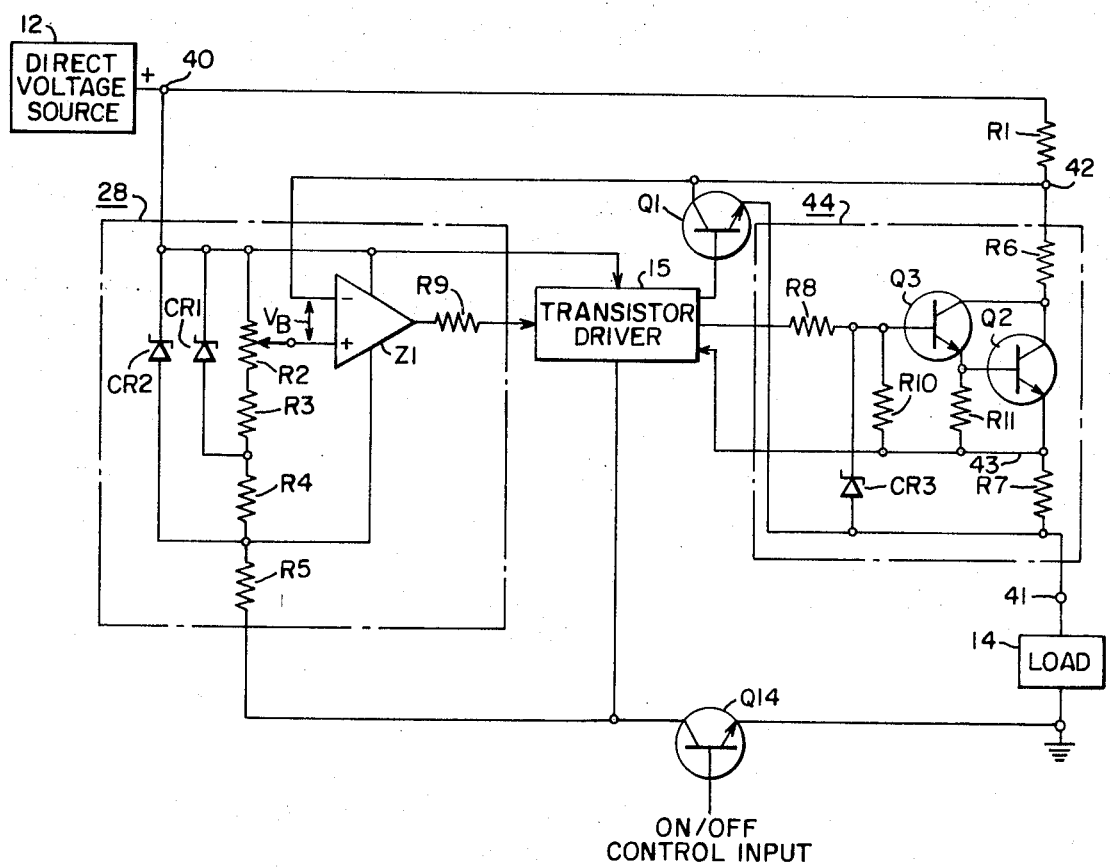
FIG. 3 is a circuit schematic of one embodiment of the present invention.

Referring to FIG. 3, an improved circuit in accordance with this invention is shown. A static switching and amplifying device, transistor Q1, which is an NPN transistor in this example, is the main power transistor between the direct voltage supply 12 and load 14 with its collector connected to a supply circuit point 40 through resistor R1 and its emitter to load circuit point 41. Also connected to point 42 on the load side of R1 is a group of components including a pair of NPN transistors Q2 and Q3 connected in a Darlington amplifier with their collectors connected in common through resistor R6 to point 42. The base of Q3 is connected through resistor R10 to line 43 as is also the base of Q2 (and emitter of Q3) through resistor R11 and, additionally, the emitter of Q2. The base of Q3 is also connected to load circuit point 41 through the reverse direction of zener diode CR3. Resistor R7 is connected between load circuit point 41 and line 43. For convenience, those elements within the closed dashed line 44 will be sometimes referred to as the power sharing network circuit portion.

A transistor driver circuit 15 has an output connected to the base of Q1 and another output connected to the collector of Q14, an NPN transistor for on-off control. Driver circuit 15 may be, and preferably is, formed in accordance with the teachings of copending application, Ser. No. 124,310 filed Mar. 15, 1971 by the present inventor and assigned to the present assignee. Driver circuit 15 has another output through resistor R8 to the base of Q3 and it has inputs from supply point 40, from the power sharing network 44 on line 43, and from a circuit portion 28 to be referred to as a current limit controller.

The current limit controller 28 includes an operational amplifier Z1 with its output connected to the driver through resistor R9. Z1 is supplied from circuit point 40 and on its low voltage side is connected through resistor R5 to ground. Z1 has a positive input point connected through variable resistor R2 to point 40 and a negative input point connected to point 42. The circuit branch including R2 also includes serially connected resistors R3, R4 and R5. A zener diode CR1 is reversely connected from point 40 to a point between R3 and R4. Another zener diode CR2 is reversely connected from point 40 to a point between R4 and R5.

Figure 1:
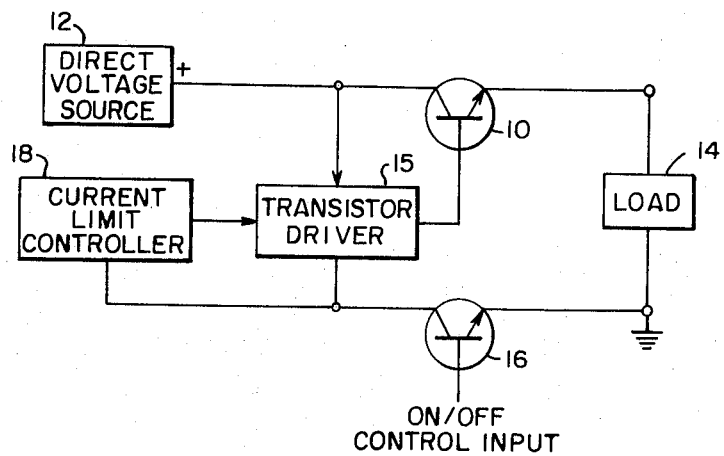
FIG. 1 is a schematic of a circuit in accordance with prior technology that has been discussed previously in this specification.

In operation, when Q14 is on, base drive current is applied to Q1. The base drive current to Q1 is controlled by current limit control means 28 in generally the same manner as was previously described in connection with FIG. 1. A more detailed description of the operation of preferred forms of controller 28 will be given later.

The driver circuit 15 is also suitably arranged to apply a fixed base drive current through R8 to the base of Q3 to hold the Darlington pair comprising Q2 and Q3 normally in saturation. During the current limiting mode of operation, with Q1 not in saturation, the voltage across Q1 appears across resistors R6 and R7. The values of R6 and R7 can readily be chosen so that a substantial reduction in the power dissipation in Q1 can be realized. However, if Q2 and Q3 were not present and R6 and R7 are of values chosen to supply the full load current (e.g., 1.5 times rated load current) at a substantial overvoltage of 80 volts input, the reduction in dissipation in Q1 would not be substantial at nominal input voltage levels. The circuit of FIG. 3 however, permits Q2 and Q3 to come out of saturation for the worst case, a zero impedance load, at some input voltage level, V1, so they will dissipate some power and permit a more desirable selection of lower resistance values for R6 and R7. Control of the supply overvoltage level, V1, at which Q2 and Q3 come out of saturation is provided by zener diode CR3 and resistor R7.

From the foregoing, therefore, the circuit is designed to effect a change of conditions above and below a selected voltage, V1. During input voltage conditions below V1, closed loop current limiting is controlled by Z1 and Q1. For input voltage levels above V1, closed loop current limiting is controlled by CR3, R6, R7, Q2 and Q3.

Figure 2:
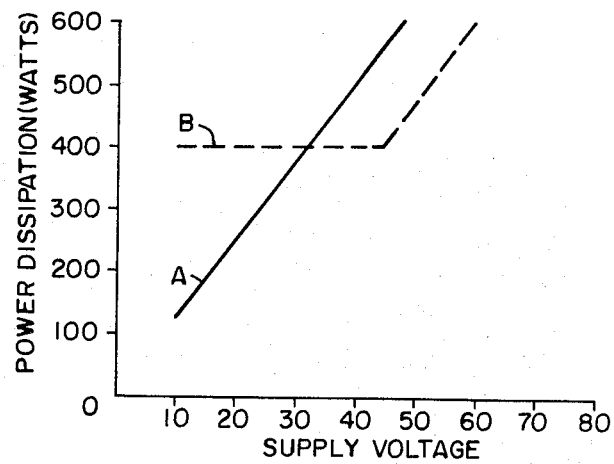
FIG. 2 is a set of curves of power dissipation versus supply voltage used in describing the operation of the circuit of FIG. 1.

For cases in which the load appearing in the circuit is not of zero impedance (e.g., a shorted load) the actual supply voltage is permitted to exceed V1, since some voltage is across the load, before Q2 and Q3 pull out of saturation. Most of the present discussion, and the curves of FIGS. 2, 4 and 5 are for the worst case condition of a zero impedance load.

Figure 4:
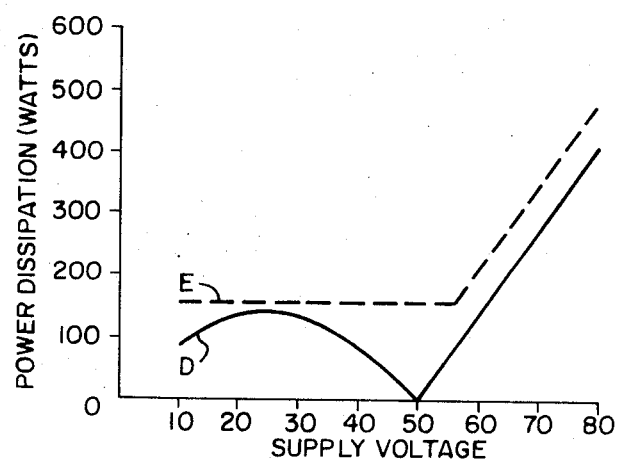
FIG. 4 is a set of curves of power dissipation versus supply voltage for circuits in accordance with this invention, such as FIG. 3.
Figure 5:
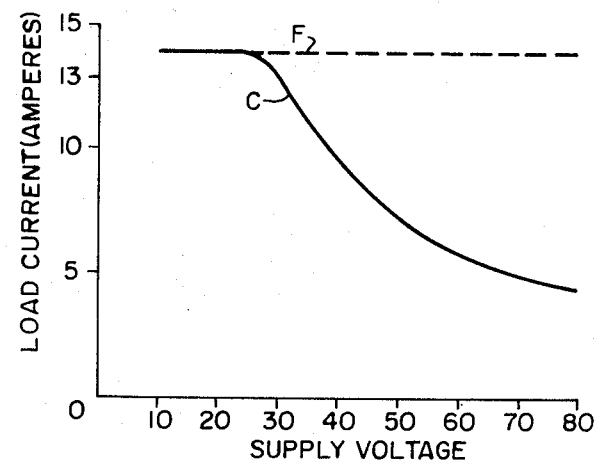
FIG. 5 is a set of curves of load current amperes versus supply voltage to compare the current limiting capability of circuits such as are shown in FIGS. 1 and 3; and, FIG. 6 is a schematic diagram of a more detailed embodiment of the present invention.

FIGS. 4 and 5 illustrate the design capability of circuits in accordance with this invention. If V1 is selected to be 50 volts and the total value of R6 plus R7 is selected to be 1.2 times the rated load resistance, then in a 10 ampere, 28 volt system, R6 plus R7 equals 28v./10a. times 1.2 or 3.4 ohms. For such a circuit the power dissipation levels are shown in FIG. 4. Curve D shows the required transistor dissipation which is well within the capability of 2N3773 transistors, shown in Curve E, or similar low cost devices. In FIG. 4, Curve D, to the left of 50 volts the dissipation is that required of Q1 while to the right of 50 volts it is that required of transistors Q2 and Q3. The difference in dissipation values of Curve D of FIG. 4 and Curve A of FIG. 2 is that dissipation handled by resistors R6 and R7. The circuit of FIG. 3 requires no cutback on current limiting at high voltages. Current limiting can be maintained at 1.4 times rated current up to and even beyond 80 volts input as shown by Curve F of FIG. 5 which contrasts with the prior art capability shown in Curve C, which is similar to that reported in the above referred to article by Dickey et al.

Figure 6:
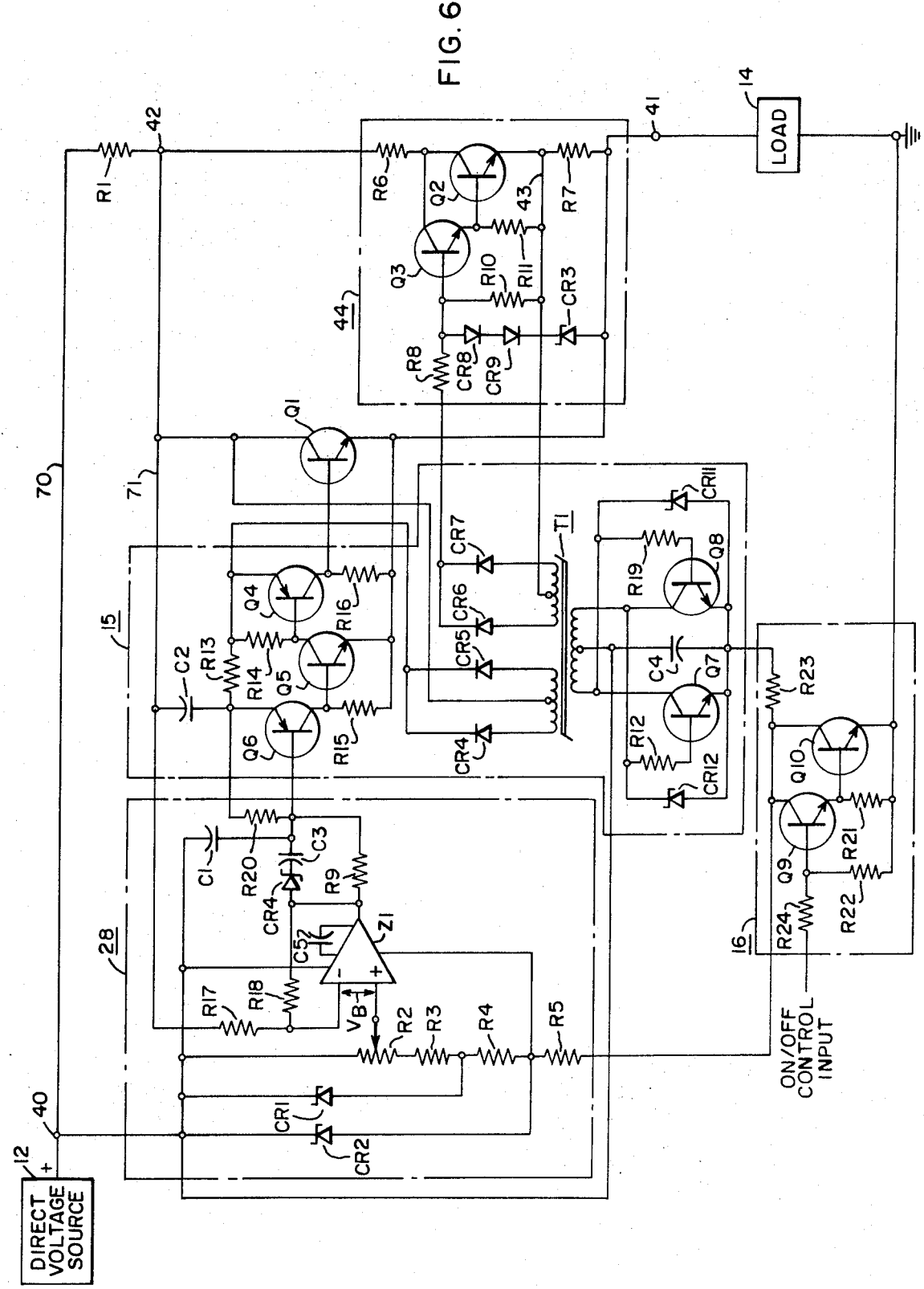

An actual circuit in accordance with this invention that has been successfully operated is shown in FIG. 6. This circuit is designed for optimum performance with readily available, economical components. Where appropriate the same reference numeral and/or letter are used as in FIG. 3 although additional elements are also shown.

The following table identifies individual components that were used.

| Component | Value |
|---|---|
| Resistor R1 | 0.005 ohms |
| Supply + 28 V. DC nominal | |
| Transistor Q1 and Sharing Net-work 44 | |
| Transistors Q1 and Q2 | 2N3773 |
| Transistor Q3 | 2N3441 |
| Zener diode CR3 | 5.6 v. breakdown |
| Resistor R6 | 3.0 ohms |
| Resistor R7 | 0.4 ohms |
| Resistor R8 | 15 ohms |
| Resistor R10 | 1000 ohms |
| Resistor R11 | 100 ohms |
| Diodes CR8 and CR9 | 1N4001 |
| Transistor Driver Circuit 15 | |
| Transistor Q4 | 2N3790 |
| Transistor Q5 | 2N3441 |
| Transistor Q6 | 2N4928 |
| Transistors Q7 and Q8 | 2N2243 |
| Transformer T1 11:1 turns ratio, | Core Magnetics Inc. type 5056–ID |
| Diodes CR4, CR5, CR6 and CR7 | 1N4942 |
| Zener Diodes CR11 and CR12 | 62 v. breakdown |
| Capacitor C2 | 100 microf. |
| Resistor R13 | 100 ohms |
| Resistor R14 | 560 ohms |
| Resistor R15 | 100 ohms |
| Resistor R16 | 47 ohms |
| Resistors R19 and R12 | 5100 ohms |
| Capacitor C4 | 5.6 microf. |
| On-Off Control Circuit 16 | |
| Transistors Q9 and Q10 | 2N3020 |
| Resistor R21 | 1 k. ohms |
| Resistors R22 and R24 | 20 k. ohms |
| Resistor R23 | 80 ohms |
| Current Limit Controller 28 | |
| Operational Amplifier | Type 101A |
| Zener Diode CR1 | 6.4 v. breakdown |
| Zener Diode CR2 | 10 v. breakdown |
| Resistor R2 | 200 ohms, variable |
| Resistor R3 | 10 k. ohms |
| Resistors R4 and R5 | 1 k. ohms |
| Resistor R9 | 2.4 k. ohms |
| Resistor R17 | 200 k. ohms |
| Resistor R18 | 10 M. ohms |
| Reistor R20 | 2000 ohms |
| Zener Diode CR4 | 3.3 v. breakdown |
| Capacitor C1 | 5.6 microf. |
| Capacitor C3 | 0.1 microf. |
| Capacitor C5 | 5 picof. |

The circuit performed as described hereinbefore and shown in Curve D of FIG. 4 (within the capability of 2N3773 transistors) and in Curve F of FIG. 5 (uniform current limiting at 1.4 times rated current over a supply voltage range of 10 volts to 80 volts). These figures are for a shorted load.

Circuits as described provide a material cost saving of $60 to $70 on a 10 ampere switch or approximately 50 percent of the material cost as compared with the prior circuit which did not perform as well. Higher rated (e.g., 30 amperes) switches for remote power controllers are thus made feasible with economy. The overall circuit is amenable to hybrid manufacturing techniques and has improved heat rejection capabilities due to the increased number of and the increased surface area of the power dissipating elements.

Current limit controller 28 disclosed in FIGS. 3 and 6 is a preferred configuration that provides certain advantages over the prior art. FIG. 3 gives a basic configuration while FIG. 6 includes further refinements as used in practice.

Referring particularly to FIG. 6, controller 28 works from a load current signal developed on lines 70 and 71 connected respectively to points 40 and 42. Of the various generally known methods of current sensing, the resistive shunt is the simplest and lightest weight approach. The voltage drop across the shunt R1 can be made small enough (e.g., 50 mv. to 100 mv.) to maintain an efficiency level comparable to other current sensing techniques including bi-metal switches or magnetic devices.

The operation of controller 28 in comparing the voltage resulting from the sensed load current with a reference (developed by CR1) is substantially in accordance with known applications of operational amplifiers, particularly integrated circuit operational amplifiers. However, the performance of the overall circuit of FIG. 6 is definitely affected by the location of the resistive shunt. In contrast with the above referred to article by Dickey et al. in which such a shunt is indicated on the load side of the main power transistor, it has been found to be highly advantageous to locate the shunt (resistor R1 and conductors 70 and 71) on the supply side of the power transistor. This is because a shunt which is located on the load side can be at any voltage level between the direct voltage supply and ground depending on the load impedance. With the shunt "floating" in this manner, the circuitry to sense the voltage across the shunt must have high common mode voltage rejection which can be obtained only at the expense of increased complexity and cost.

I claim:

1. Apparatus to control the application of DC power from a supply circuit point to a load circuit point, comprising: a first static switching and amplifying device having first and second electrodes connected in a first circuit branch between a direct voltage source and a load to be supplied by said source and a third, control electrode; means for driving said device to a conduction level determined by the load current level flowing at said supply circuit point; a power sharing circuit portion connected in parallel with said device between said supply circuit point and said load circuit point, said power sharing circuit portion being operative to dissipate power at a first, low level while voltage at said supply circuit point is below a predetermined level and to dissipate power at a second higher level when said voltage at said supply circuit point is above said predetermined level, said power sharing circuit portion comprising at least one additional static switching and amplifying device element and at least one resistive element having a resistive impedance substantially greater than any resistive impedance in series with said first device in said first circuit branch, means to hold said additional device in a saturated, fully conductive condition when said voltage is below said predetermined level and to bring said additional device out of saturation at said predetermined voltage level.

2. The subject matter of claim 1 wherein:

said static switching and amplifying devices are transistors, said at least one additional device comprises a pair of transistors connected in a Darlington amplifier configuration; said at least one resistive element comprises at least a first resistor on the supply circuit point side of said power sharing circuit portion and a second resistor on the load circuit point side of said power sharing circuit portion.

3. The subject matter of claim 1 wherein:

said means for driving said device includes current limit control means to ensure the conduction level of said switch means stays within a predetermined maximum, and further comprising means to sense said current conduction level.

4. The subject matter of claim 3 wherein:

said means to sense said current conduction level includes a resistive shunt connected in said first circuit branch between said source and said device, said resistive shunt being the sole impedance element in series with said device in said first circuit branch.

5. The subject matter of claim 4 wherein:

said current limit control means comprises an operational amplifier that compares a voltage resulting from the current sensed by said means to sense with a reference voltage and when said sensed voltage exceeds a predetermined relation with said reference voltage causes the signal to said control electrode of said device to be modified.

* * * * *